United States Patent Office 3,419,402
Patented Dec. 31, 1968

3,419,402
PROCESS OF PREPARING A FREEZE-DRIED
GELLED PRODUCT
Maurie Laskin, Milwaukee, Wis., assignor to W. R. Grace
& Co., New York, N.Y., a corporation of Connecticut
No Drawing. Filed Nov. 21, 1967, Ser. No. 684,613
6 Claims. (Cl. 99—199)

ABSTRACT OF THE DISCLOSURE

Process for preparing a freeze-dried product containing a gelling agent by freezing a monolithic shape of the desired product at atmospheric pressure and subsequently dehydrating it to less than 4% by heating at reduced pressures of less than 1.5 millimeters of mercury.

---

This application is a division of United States patent application Ser. No. 464,867, filed June 17, 1965 and now abandoned, which in turn was a continuation-in-part of United States patent application Ser. No. 324,240, filed Nov. 18, 1963, which was later abandoned in favor of United States patent application Ser. No. 464,832, also filed June 17, 1965. This application is also related to United States patent application Ser. No. 465,835, filed June 18, 1965; and United States patent application Ser. No. 684,626, filed concurrently herewith as a divisional of the aforesaid application Ser. No. 464,867.

In applications Ser. Nos. 324,240 and 464,832 there has been disclosed novel freeze-dried ice milk products (e.g., freeze-dried, storage-stable ice cream); methods for preparing such products; and confectionery products employing such freeze-dried ice milk products as, e.g., centerpieces and/or fillers in candies and like products enrobed with chocolate or other candy coatings.

In application Ser. No. 464,835 it has been disclosed that similar drying methods can be applied to gelatin-based materials (such as the well-known flavored gelatin desserts and/or gelatin-containing puddings or pie fillings) to produce still further novel rehydratable products useful per se, or as centerpieces and/or fillers in candy products.

The present invention relates to yet further applications of the techniques disclosed in the aforesaid copending applications to produce certain other new and useful confectionery and/or candy products. In particular, the present invention relates to freeze-dried cake and pie fillings, puddings, and jellies (such as pectin fruit jellies); to methods for preparing them; and to novel candy and/or cookie items incorporating such products as centerpieces, fillers and the like.

Thus in one broad aspect, the present invention is directed to freeze-dried, rehydratable, storage-stable monolithic shapes of the aforementioned pudding, cake or pie filling, or jelly products, which shapes are enrobed in a surrounding exterior coating of chocolate, caramel or other like candy coating material to produce new and useful candy items.

In another broad aspect, the invention is directed to certain new and useful freeze-dried, storage-stable products.

In another aspect, the invention is directed to methods for preparing the aforementioned freeze-dried, rehydratable, storage-stable products; and for preparing candy items therefrom.

Typical examples of materials that can be used in the practice of the present invention are found, for example, in "The Chemical Formulary," H. Bennett (chief editor), Chemical Publishing Co., Inc., New York, N.Y., as follows:

Volume I (1933): pages 48–52, inclusive, candy jellies; page 52, starch-base chocolate pudding
Volume II (1935): pages 193–94, pie and cake fillings; pages 198–99, starch-base puddings and desserts; page 199, jelly candies
Volume III (1936): pages 155–56, jellied candies; pages 157–59, fruit jellies; page 159, pie filling
Volume VII (1945): pages 167–70, custards and pie fillings; pages 169–71, baker's jelly
Volume VIII (1948): pages 148–57 and 165–66, pie fillings; page 180, pudding; pages 187–89, jellies
Volume IX (1951): page 214, pie fillings
Volume X (1957): pages 131–33 and 156–57, pie and tart fillings A review of the above typical formulae shows that each contains, as gelling agent, at least one of the materials: pectin, starch, and gel-forming natural gums, e.g., karaya gum or agar. In some cases gelatin is used as an adjunctive gelling agent in the practice of the present invention, but in all cases the products of this invention are distinguished by the use of at least one gelling agent from the group of pectin, starch and gel-forming natural gums.

It is well understood that freeze-drying techniques rely on the principle of sublimation of ice crystals and diffusion of the resulting water vapors through and out of the product. The heat of sublimation in freeze-drying processes is provided by radiation from platens or similar heat exchangers located proximate to the frozen material. Excessive heat, insufficient vacuum, or direct contact of the frozen material with the heat exchanger results in thawing or conversion of the ice to water, followed by ordinary dehydration and evaporation. This causes collapse or alteration of the cell or other physical structure of the product being dried, which of course is undesirable.

In accordance with the present invention, the initial cooling or freezing step should ordinarily be carried out at or about atmospheric pressure to avoid foaming of the frozen product. It is conventional practice in freeze-drying procedures to use evaporative cooling, i.e., the application of vacuum to reduce the temperature of the product. Such a technique is ordinarily not feasible in the practice of the present invention.

Accordingly, it is highly preferred in the practice of the present invention that prior to the introduction of the product to be freeze-dried into the vacuum chamber of the freeze-drying apparatus, it should be cooled, while at or about atmospheric pressure, to the point where it is solidly frozen, particularly in having a hard frozen surface which, in handling and forming, is not predisposed to melt, thaw or soften. In this connection a temperature of −10° Fahrenheit or preferably −20° Fahrenheit or below is used, although the melt or thaw point of the particular product is variable, depending upon its formulation, i.e., the various amounts and types of ingredients (e.g., pectin, starch, gel-forming natural gum, sugar, etc.) therein. It should be understood, however, that once the product has been cooled to the desired point, i.e., where the entire monolith including all surfaces is frozen hard, evaporative cooling may be, and usually is, used to maintain the temperature of the undehydrated frozen portions in an unthawed state during the dehydration step.

The dehydration (freeze-drying) process is carried out under low pressures, i.e., below the vapor pressure of ice at the particular temperature of the product undergoing dehydration. Preferably the pressure should be below about 1.5 millimeters of mercury, and in the most preferred embodiments of this process, below about 1.0 millimeter of mercury (absolute). It should be further understood that the pressures referred to herein, unless otherwise indicated, are absolute pressures.

The product is heated during the dehydration step of this process by means of radiant energy which is emanated from the surface of the heat exchanger platen or surface. In the initial stages of the process, while the vacuum level is being established, little or no heat may be required, particularly if the product temperature equilibrium is being established by sublimation cooling under vacuum. When heating from outside sources is required to maintain the dehydration at an economically feasible rate, it is provided by the heat exchangers. These may be operated over a broad range of temperatures and are adjusted to provide sufficient heat to maintain sublimation or dehydration at a maximum, but not so high in temperature to cause melting or thawing of the product being dried. Preferably, but not necessarily, higher temperatures should be used in the initial stages of the dehydration and are slowly decreased in stepwise fashion as drying progresses. A broad range of heat exchanger or platen temperatures that can be employed is from about 250° Fahrenheit to about 90° Fahrenheit, and preferably between about 160° Fahrenheit and 90° Fahrenheit. The product temperature, at least with respect to the frozen undehydrated portion, should be maintained at a point where no substantial thawing takes place, i.e., about —10° Fahrenheit or less during the drying step.

The time of the process is variable but ordinarily the freeze-drying can be carried out over a period of from about one or two to about twenty hours. In the freeze-drying dehydration method of the present invention the product should be cut, molded or otherwise formed into monolithic slabs, balls, pieces, or sheets—preferably less than one inch thick, and in the most preferred instance about one-half inch or less in thickness. This is typically done before placement in the freeze-drying apparatus, and usually before it is frozen into a hard solid monolith to preclude foaming. Ordinarily, the thinner slabs permit the more rapid diffusion of vapor from the core of frozen material when it is being dehydrated, as well as presenting a broader sublimation interface. The products of the present invention are dried to a low moisture content, preferably less than 4 percent moisture (weight basis) and most preferably less than 1½ percent moisture.

The following example will illustrate the carrying out of the process of the present invention:

EXAMPLE 1

Commercially available flavored (butterscotch, vanilla, chocolate, lemon) pudding and pie filling powders (3 to 4 ounces each) containing sugar, dextrose, cornstarch, and flavorants as needed (e.g., cocoa for the chocolate sample) were purchased. These were made into puddings in accordance with manufacturers' instructions, e.g., gradually dissolving in 2 cups of milk and cooking over medium heat with constant stirring until pudding thickens and begins to boil, followed by chilling in suitable containers.

The samples were initially frozen solid to temperatures of —10° to —20° Fahrenheit at atmospheric pressure and then cut into monolithic slabs and pieces about 5/16 inch thick. These were placed in the trays of a freeze-drier chamber (Vacudyne Pilot Freeze Drier VPFD-B) and the vacuum was turned on. The chamber pressure was drawn down to a vacuum of about 0.25 millimeter of mercury (absolute) over a time period of about 10 minutes (hereinafter referred to as the "pull down" time). At the end of the pull down the sample temperatures were all about —20° Fahrenheit. The heat in the drier platens was then applied according to the following schedule of platen temperature and time:

| Platen temperature, °F. | Time |
|---|---|
| 250 | hours__ 1 |
| 200 | do____ 3 |
| 125 | minutes__ 30 | after which the vacuum was released and the products removed. Total treatment time (including pull down) was 4 hours and 40 minutes. All samples dried very well. Moisture contents for each were below about one percent. The body and texture were good. The freeze-dried monoliths were very well suited for coating with chocolate, caramel or other candy coating to make a candy bar or like candy piece. The candy coating (e.g., chocolate) will act as an effective moisture barrier surrounding the freeze-dried monolithic core or centerpiece, thus precluding rehydration by atmospheric moisture. The products could also be stored, as such, or after grinding to a fine powder in hermetically sealed moisture-proof containers without refrigeration for extended periods of time without significant degradation.

The foregoing specific example illustrates the invention as applied to certain specific products. It will be understood that the invention may be applied to other products such as those described hereinabove, e.g., pectin jellies such as those commercially available pectin jellies based on crabapple juice, blackberry juice, grape juice, etc. It is also to be understood that these products can be used in ways other than those specifically described. In sum, it is intended that the scope of the invention be limited only as indicated by the appended claims. Thus, for example, it will be apparent that coating materials other than candy coatings may be used to protect the freeze-dried products from atmospheric moisture. Many edible coating materials which would serve such purpose are known to the art, e.g., gelatin, sodium carboxymethyl cellulose, methyl cellulose, hydroxy propyl methyl cellulose and the like. Products thus coated can be used, for example, as additives for dry cereals; as food for astronauts, etc.

What is claimed is:

1. Process for preparing a rehydratable freeze-dried food product selected from the group consisting of jellies, puddings, and cake or pie fillings, said food product containing at least one of the group consisting of pectin, starch, and gel-forming natural gums as gelling agent; which comprises cooling a monolithic shape of the said product at about atmospheric pressure to a temperature at which it is a hard-frozen solid and then dehydrating said hard-frozen solid shape to a moisture content of less than about 4 percent by applying heat thereto at reduced pressures of less than about 1.5 millimeters of mercury (absolute) while controlling the rate of heat application so as to maintain the hard-frozen solid portion of said product in the hard-frozen state until dehydration is essentially complete.

2. Process of claim 1 wherein said food product is a pectin jelly.

3. Process of claim 1 wherein said food product is a starch-containing pudding.

4. Process of claim 1 wherein said food product is a starch-containing cake or pie filling.

5. Process of claim 1 including the additional step of applying to the dehydrated product a continuous enveloping coating of an edible coating material.

6. Process of claim 5 wherein said edible coating material is candy chocolate.

References Cited

UNITED STATES PATENTS

| 1,127,114 | 2/1915 | Thompson | 99—199 XV |
| 2,166,074 | 7/1939 | Reichel | 99—199 XV |

FOREIGN PATENTS 549,606  12/1957  Canada.

RAYMOND N. JONES, *Primary Examiner.*

J. M. HUNTER, *Assistant Examiner.*

U.S. Cl. X.R.

99—129, 134, 92, 83